United States Patent
Xue et al.

(10) Patent No.: US 9,667,292 B2
(45) Date of Patent: May 30, 2017

(54) METHOD OF PROCESSING SIGNALS, DATA PROCESSING SYSTEM, AND TRANSCEIVER DEVICE

(71) Applicant: Intel Corporation, Santa Clara, CA (US)

(72) Inventors: Feng Xue, Redwood City, CA (US); Yang-Seok Choi, Portland, OR (US); Shu-Ping Yeh, New Taipei (TW); Shilpa Talwar, Los Altos, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/751,236

(22) Filed: Jun. 26, 2015

(65) Prior Publication Data

US 2016/0380661 A1    Dec. 29, 2016

(51) Int. Cl.
*H04B 1/40* (2015.01)
*H04B 1/12* (2006.01)

(52) U.S. Cl.
CPC ............... *H04B 1/123* (2013.01); *H04B 1/40* (2013.01)

(58) Field of Classification Search
CPC .................................. H04B 1/123; H04B 1/40
(Continued)

(56) References Cited

U.S. PATENT DOCUMENTS

| 5,499,399 A * | 3/1996 | Bond | ....................... | H01Q 3/24 455/296 |
| 5,517,531 A * | 5/1996 | Bond | ....................... | H01Q 3/24 375/346 |

(Continued)

FOREIGN PATENT DOCUMENTS

| EP | 2174235 A2 * | 4/2010 | ............. H04L 67/14 |
| WO | 2007050593 A2 | 5/2007 | |
| WO | WO 2007050593 A2 * | 5/2007 | ......... G06K 9/00523 |

OTHER PUBLICATIONS

Construction of the Wiener Series, App. III—Published Online—May 29, 2012—Internet Citation.*

(Continued)

*Primary Examiner* — Daniel Washburn
*Assistant Examiner* — Berhanu Tadese
(74) *Attorney, Agent, or Firm* — Viering, Jentschura & Partner mbB

(57) ABSTRACT

A data processing system may include a transmit circuit configured to transmit a first signal sequence comprising one or more signals, a receive circuit configured to transmit a second signal sequence comprising one or more additional signals, wherein one or more signals of the second signal sequence comprise an interference component related to the first signal sequence, and a processing circuit. The processing circuit may be configured to generate a kernel set comprising one or more kernels based on the first signal sequence, wherein a first kernel of the kernel set comprises: a first complex exponential component of the first kernel based on the phase of a first signal of the first signal sequence, and a second complex exponential component of the first kernel based on the amplitude of the first signal of the first signal sequence, and apply the kernel set to generate a solution to a linear system, wherein the solution to the linear system represents a substantially linear relationship between the kernel set and the signal component of the second signal sequence arising from the first signal sequence.

20 Claims, 5 Drawing Sheets

(58) Field of Classification Search
USPC .................................................. 375/219, 224
See application file for complete search history.

(56) References Cited

U.S. PATENT DOCUMENTS

| | | | | |
|---|---|---|---|---|
| 5,555,310 | A * | 9/1996 | Minami | H04S 1/00 379/406.06 |
| 6,141,390 | A * | 10/2000 | Cova | H03F 1/3247 330/149 |
| 6,512,797 | B1 * | 1/2003 | Tellado | H04L 27/2602 370/319 |
| 6,687,235 | B1 * | 2/2004 | Chu | H04B 3/23 370/286 |
| 7,385,705 | B1 * | 6/2008 | Hoctor | G01J 3/02 356/456 |
| 8,320,868 | B2 * | 11/2012 | Pratt | H04B 1/525 375/346 |
| 8,416,759 | B1 * | 4/2013 | Narasimhan | H04W 56/0035 370/344 |
| 2005/0163250 | A1 * | 7/2005 | McCallister | H03F 1/3252 375/296 |
| 2005/0163252 | A1 * | 7/2005 | McCallister | H03F 1/3247 375/296 |
| 2007/0071120 | A1 * | 3/2007 | Talwar | H04L 27/2614 375/260 |
| 2008/0249765 | A1 * | 10/2008 | Schuijers | G10L 19/0212 704/203 |
| 2009/0257477 | A1 * | 10/2009 | Khayrallah | H04B 1/7105 375/148 |
| 2011/0182330 | A1 * | 7/2011 | Olson | G01S 5/0215 375/148 |
| 2011/0182344 | A1 * | 7/2011 | Rosenhouse | H04B 17/345 375/224 |
| 2011/0270590 | A1 * | 11/2011 | Aparin | G06K 9/00496 703/2 |
| 2012/0140618 | A1 * | 6/2012 | Wigren | H04B 1/7103 370/229 |
| 2012/0140860 | A1 * | 6/2012 | Rimini | H04B 1/525 375/350 |
| 2013/0044791 | A1 * | 2/2013 | Rimini | H04B 1/109 375/219 |
| 2013/0166259 | A1 * | 6/2013 | Weber | G06F 17/5009 703/2 |
| 2014/0169431 | A1 * | 6/2014 | Arambepola | H04L 27/2626 375/227 |
| 2014/0269857 | A1 * | 9/2014 | Rimini | H04L 27/0008 375/219 |
| 2015/0010118 | A1 * | 1/2015 | Beidas | H04L 25/03006 375/341 |
| 2015/0032788 | A1 * | 1/2015 | Velazquez | H04L 27/265 708/819 |
| 2015/0098521 | A1 * | 4/2015 | Beidas | H04B 7/18517 375/296 |
| 2015/0156003 | A1 * | 6/2015 | Khandani | H04B 1/525 370/278 |
| 2015/0156004 | A1 * | 6/2015 | Khandani | H04L 5/1423 370/278 |
| 2015/0311929 | A1 * | 10/2015 | Carbone | H04B 1/1027 455/78 |
| 2016/0173165 | A1 * | 6/2016 | Choi | H04B 1/525 455/78 |
| 2016/0182104 | A1 * | 6/2016 | Xue | H04J 11/0056 455/78 |

OTHER PUBLICATIONS

A. Borys, On Modelling of Nonlinear Systems and Phenomena with the Use of Volterra and Wiener Series, TransNav, vol. 9, No. 1, Mar. 2015.*

F. Kuech, A. Mitnacht and W. Kellermann, "Nonlinear acoustic echo cancellation using adaptive orthogonalized power filters," Proceedings. (ICASSP '05). IEEE International Conference on Acoustics, Speech, and Signal Processing, 2005., 2005, pp. iii/105-iii/108 vol. 3.*

R. Raich, Hua Qian and G. T. Zhou, "Digital baseband predistortion of nonlinear power amplifiers using orthogonal polynomials," Acoustics, Speech, and Signal Processing, 2003. Proceedings. (ICASSP '03). 2003 IEEE International Conference on, 2003, pp. VI-689-92 vol. 6.*

F. Kuech, "Approaches to Nonlinear Acoustic Echo Cancellation," ITG Conference on Voice Communication [8. ITG-Fachtagung], Aachen, Germany, 2008, pp. 1-4.*

H. M. Abbas, "A Novel Fast Orthogonal Search Method for design of functional link networks and their use in system identification," 2007 IEEE International Conference on Systems, Man and Cybernetics, Montreal, Que., 2007, pp. 2743-2747.*

International Search Report received for corresponding International Application No. PCT/US2016/031404 mailed on Aug. 17, 2016, 17 pages of Search Report.

Syrjaelae et al, "Self-interference cancellation in full-duplex radio transceivers with oscillator phase noise", European Wireless 2014, 20th European Wireless Conference, May 2014, 6 pages.

* cited by examiner

METHOD OF PROCESSING SIGNALS, DATA PROCESSING SYSTEM, AND TRANSCEIVER DEVICE

TECHNICAL FIELD

Various embodiments relate generally to a method of processing signals, a data processing system, and a transceiver device.

BACKGROUND

Linear estimation techniques may be expanded to approximate solutions to non-linear systems through the use of kernelization functions. These non-linear functions may be utilized to map input signals of a non-linear system in order to produce a set of kernels. The output signals of the system may subsequently be assumed to be a linear function of the resulting kernels, thereby allowing for the use of conventional linear estimation techniques in order to realize a comprehensive system model.

The estimation of non-linear systems may be of interest in a variety of real world scenarios. Electronic applications may be of particular relevance, such as the non-linear relationships characterizing voltage and power through resistive components, oversaturated amplification components, digital logic devices, electronic distortion, etc.

Once obtained, solutions to these non-linear systems may be applied in order to improve device performance. One such application is the cancellation of leakage signals in for wireless transceiver devices susceptible to self-interference, where signals transmitted by the transmit chain leak into the receive chain, thereby introducing interference into received signals. The associated interference may be effectively mitigated and/or canceled by approximating the signal path between the transmit chain and the receive chain, thereby obtaining a model characterizing the relationship between transmit signals transmitted by the transmit chain and resulting leakage signals contained in the received signal at the receive chain.

A variety of classical linear estimation techniques, such as linear mean square (LMS) or recursive least square (RLS), may then be applied in order to approximate a solution modeling the substantially linear relationship between the kernels and the leakage signal.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
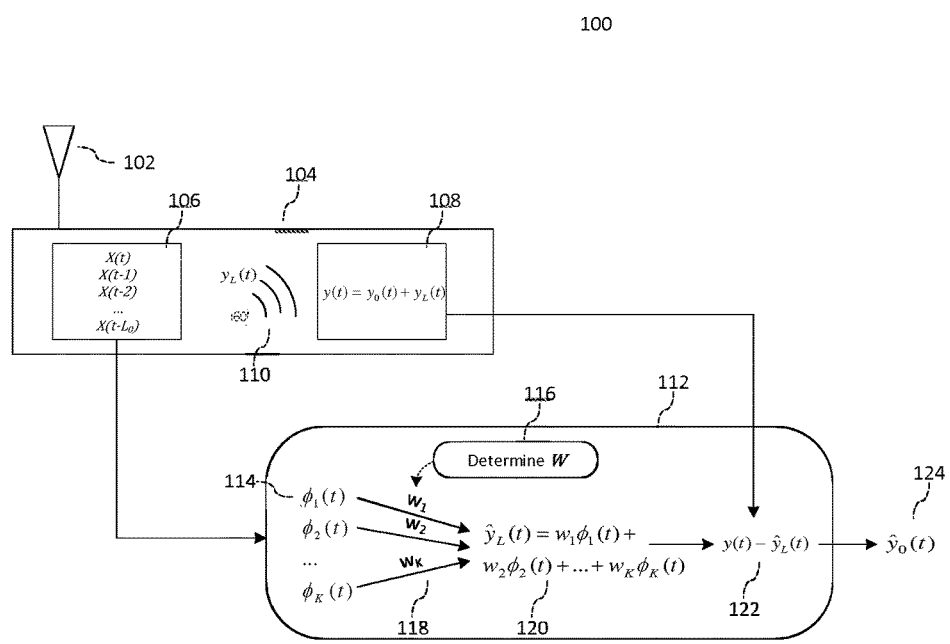
FIG. 1 shows a mobile system.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The words "plural" and "multiple" are used herein to expressly refer to a quantity greater than one. Accordingly, any phrases explicitly invoking the aforementioned words (e.g. "a plurality of [objects]", "multiple [objects]") referring to a quantity of objects is intended to expressly refer more than one of the said objects. The terms "group", "set", "collection", "series", "sequence", "grouping", "selection", etc., are used herein to mean a quantity equal to or greater than one, i.e. one or more. Accordingly, the phrases "a group of [objects]", "a set of [objects]", "a collection of [objects]", "a series of [objects]", "a sequence of [objects]", "a grouping of [objects]", "a selection of [objects]", "[object] group", "[object] set", "[object] collection", "[object] series", "[object] sequence", "[object] grouping", "[object] selection", etc., used herein in relation to a quantity of objects is intended to refer to a quantity of one or more of said objects. It is appreciated that unless directly referred to with an explicitly stated plural quantity (e.g. "two [objects]" "three of the [objects]", "ten or more [objects]", "at least four [objects]", etc.) or express use of the words "plural", "multiple", or similar phrases, references to quantities of objects are intended to refer to one or more of said objects.

It is appreciated that any vector and/or matrix notation utilized herein is exemplary in nature and is employed solely for purposes of explanation. Accordingly, it is understood that the approaches detailed in this disclosure are not limited to being implemented solely using vectors and/or matrices, and that the associated processes and computations may be equivalently performed with respect to sets, sequences, groups, etc., of data, observations, information, signals, etc.

Furthermore, it is appreciated that references to a "vector" may refer to a vector of any size or orientation, i.e. including a 1×1 vector (e.g. a scalar), an 1×M vector (e.g. a row vector), and an M×1 vector (e.g. a column vector). Similarly, it is appreciated that references to a "matrix" may refer to matrix of any size or orientation, i.e. including a 1×1 matrix (e.g. a scalar), a 1×M matrix (e.g. a row vector), and a M×1 matrix (e.g. a column vector).

As used herein, a "circuit" may be understood as any kind of a logic implementing entity, which may be special purpose circuitry or a processor executing software stored in a memory, firmware, or any combination thereof. Furthermore, a "circuit" may be a hard-wired logic circuit or a programmable logic circuit such as a programmable processor, for example a microprocessor (for example a Complex Instruction Set Computer (CISC) processor or a Reduced Instruction Set Computer (RISC) processor). A "circuit" may also be a processor executing software, for example any kind of computer program, for example a computer program using a virtual machine code such as for example Java. Any other kind of implementation of the respective functions which will be described in more detail below may also be understood as a "circuit". It may also be understood that any two (or more) of the described circuits may be combined into one circuit.

As used herein, a "cell" in the context of telecommunications may be understood as a sector served by a base station. Accordingly, a cell may be a set of geographically co-located antennas that correspond to a particular sectorization of a base station. A base station may thus serve one or more "cells" (or sectors), where each cell is characterized by a distinct communication channel An "inter-cell handover" may thus be understood as handover from a first "cell" to a second "cell", where the first "cell" is different than the second "cell". "Inter-cell handovers" may be characterized as either "inter-base station handovers" or "intra-base station handovers". "Inter-base station handovers" may be understood as handover from a first "cell" to a second "cell", where the first "cell" is provided at a first base station and the second "cell" is provided at a second, different base station. "Intra-base station handovers" may be understood as a handover from a first "cell" to a second "cell", where the first "cell" is provided at the same base station as the second "cell". A "serving cell" may be understood as a "cell" which a mobile terminal is currently connected to according to the mobile communication protocols of the associated mobile communication network standard.

Linear estimation techniques may seek to generate a set of parameters that characterize the relationship between the inputs and outputs of a system. The use of kernelization functions may be necessary in applications to non-linear systems in order to effectively address the non-linear character of the underlying system. These kernelization functions may be utilized in order to generate a set of kernelized inputs that correspond to the original system inputs. Linear estimation may then be applied in order to generate a parameter set that models the relationship between the kernelized inputs and the system outputs of the non-linear system.

As such linear estimation techniques derive the parameter set based on the relationship between the kernelized inputs and the system outputs, the nature of the kernelization functions have a substantial impact on system performance. Accordingly, improper selection of kernelization functions may severely limit the accuracy of linear estimation techniques as applied to non-linear system approximation. Additionally, use of kernelization functions having large exponents or kernelization functions producing non-orthogonal kernels may result in significant increases in complexity, thereby reducing the efficiency of the estimation.

It is appreciated that while sections of this disclosure may explicitly address the application of linear estimation techniques to signal leakage in transceiver devices, the approaches and implementations detailed herein may be similarly applied to any number of non-linear systems. It is appreciated that appropriate selection of kernelization functions may allow linear estimation techniques to be employed in the approximation of any non-linear function.

As detailed in the Background section of this disclosure, a number of different electronic systems may be characterized by a non-linear relationship between system inputs and outputs. Accurate estimates of these non-linear systems may allow for a variety of system-dependent performance enhancements, from improved component manufacturing design, noise and distortion reduction, circuit tuning, etc.

Self-interference caused by leakage signals in transceiver devices, especially devices performing simultaneous wireless transmission and reception, may be of particular interest. Due to a number of device architecture features, such as shared antennas, duplexing circuitry, physical proximity, and any other shared hardware components, complete isolation between transmit chains and receive chains in transceivers may not be possible. As a result, signals transmitted by a transmit chain may inevitably "leak" onto signals received by a receive chain, thereby corrupting the received signals. The quality of wireless reception may be degraded as a direct result of this leakage.

As the transmit chain signal is known at the transceiver device, it may be possible to estimate the resulting leakage signal and subsequently utilize the estimated leakage signal to cancel all or part of the actual leakage signal from signals received by the receive chain. This leakage estimation may be realized by developing a model describing the signal path between the offending transmit chain and the victimized receive chain. The relationship between signals transmitted by the transmit chain and the resulting leakage signal found in the signal received at the receive chain may be approximated, thereby providing a mechanism for estimating the leakage signal based on the original transmit chain signal. Accurate generation of the estimated leakage signals may consequently allow for effective leakage cancellation, as subtractive cancellation may be performed using the estimated leakage signal in order to remove actual leakage from the corrupted received signal to obtain a clean received signal.

The system modeling the signal path between the transmit chain and the receive path may be non-linear, such as due to differing transmit and reception frequency bands (e.g. frequency duplexing) and the presence of non-linear components in the signal path, including power amplifiers, filters, delay components, etc. Accordingly, accurate estimation of leakage signals in the receive chain may require the use of a non-linear model.

As previously detailed, kernelization functions may be utilized to decompose the non-linear leakage system into a linear combination of one or more kernels. An appropriate set of kernelization functions may thus be applied to one or more transmit chain signals (i.e. input signals to the non-linear model) in order to generate the requisite set of kernels. The leakage present in the receive chain signal (i.e. the output signal to the non-linear model) may then be assumed to be a linear function of the set of kernels, thereby producing an approximated linear system modeling a linear relationship between the set of kernels and the receive chain signals. A solution to the resulting linear system may then be obtained using linear estimation in order to generate a parameter set that effectively characterizes the relationship of interest between transmit chain signals and receive chain signals. The parameter set may then be applied to one or more further transmit chain signals in order to approximate one or more further leakage signals to be subsequently utilized to cancel out actual leakage from receive chain signals. This process may produce a "clean" receive chain signal that is substantially free of leakage.

A variety of classical linear estimation techniques, such as linear mean square (LMS) or recursive least square (RLS), may be applied in order to approximate a parameter set modeling the substantially linear relationship between the kernels and the leakage signal. The efficacy of these linear estimation techniques may be appreciably dependent on the kernelization functions utilized to generate each of the kernels. For example, utilization of non-orthogonal kernels (i.e. where the correlations between the kernels are not zero) and exponential kernelization functions may decrease efficiency, thereby requiring increased computation time and/or increased processing power.

Accordingly, proper selection of kernelization functions may result in an efficient system allowing for effective mitigation and/or cancellation of leakage. It is appreciated that similar benefits may be realized in any application utilizing kernelization, and the approaches and implementations detailed herein may be applied in a substantially similar manner in order to approximate any non-linear system.

FIG. 1 shows a block diagram illustrating mobile system 100. Mobile system 100 illustrates an example of kernelization as applied to estimation of non-linear signal leakage in a transceiver device. Mobile system 100 may correspond to a mobile communication device, such as a User Equipment (UE) operating on a wireless communication network.

Mobile system 100 may include antenna 102, transceiver 104, and leakage cancellation processor 112. As shown in FIG. 1, transceiver 104 may include transmit chain 106 and receive chain 108. As will be described, transmit chain 106 may produce leakage signal y(t), which may emanate from transmit chain 106 to receive chain 108, such as over leakage path 110. It is appreciated that while antenna 102 is depicted as a single antenna, antenna 102 may instead be implemented as an antenna array. In an exemplary aspect of the disclosure, transmit chain 106 and receive chain 108 may each be configured to operate on a separate antenna. It is appreciated that leakage problems may persist even if separate antennas are utilized for transmit and receive chains of a transceiver device.

Antenna 102 may be configured to transmit and receive wireless radio signals according to a wireless communication protocol. For example, mobile system 100 may be configured to operate as a mobile terminal on a wireless communication network. Accordingly, mobile system 100 may be configured to transmit and receive wireless radio signals according to e.g. a Third Generation Partnership Protocol (3GPP) telecommunications standard, such as Global System for Mobile Communications (GSM), Universal Mobile Telecommunications System (UMTS), or Long Term Evolution (LTE). It is appreciated that mobile system 100 may be similarly configured according to any of a variety of further communication standards or types, such as Near Field Communication (NFC), Bluetooth, Wireless Fidelity (WiFi), Worldwide Interoperability for Microwave Access (WiMAX), etc.

Antenna 102 may therefore be configured to receive wireless radio signals and to provide resulting radio frequency electrical signals to transceiver 104. Transceiver 104 may operate as a radio frequency (RF) processing circuit for downlink signal reception, and accordingly receive chain 108 may produce at least one baseband signal y(t), i.e. a receive chain signal corresponding to time t, corresponding to a received radio frequency electrical signal. Receive chain 108 may provide resulting signals such as y(t) to further components of mobile system 100, such as one or more processing circuits configured to execute a protocol stack in accordance with one of the aforementioned mobile communication standards (not explicitly shown in FIG. 1). It is appreciated that mobile system 100 may include a number of additional components, including hardware, processors, memory, and other specialty or generic hardware/processors/circuits, etc., in order to support a variety of additional operations of wireless radio communications. Mobile system 100 may also include a variety of user input/output devices such as displays, keypads, touchscreens, speakers, external buttons, etc.

Transceiver 104 may additionally operate as an RF processing circuit for uplink signal transmission. Accordingly, transmit chain 106 may receive transmit chain signal X(t) corresponding to time t from a further component of mobile system 100. Transmit chain 106 may then perform RF processing in order to prepare transmit chain signal X(t) for wireless transmission and provide a resulting RF signal to antenna 102 for wireless transmission. It is appreciated that X(t) may be either scalar- or vector-valued, such as e.g. a set of multiple scalar values each intended for a different transmit antenna (i.e. where antenna 102 is an antenna array composed of at least multiple transmit antennas).

Transmit chain 106 may be configured to transmit X(t) at time t. X(t) may be part of a sequence of transmit chain signals X(t), X(t−1), X(t−2), X(t−3), etc., where transmit chain 106 is configured to transmit previous transmit chain signals X(t−1), X(t−2), X(t−3), etc., at respective past times t−1, t−2, t−3, etc., i.e. relative to time t. In vector notation, the sequence of current and past transmit chain signals X(t), X(t−1), X(t−2), X(t−3), etc. At time t may be denoted as X(t).

Transmit chain signals X(t) may be intended for uplink transmission from mobile system 100 to one or more network access points, such as e.g. one or more base stations (not explicitly shown in FIG. 1). It is appreciated that each of transmit chain signals X(t) may be intended for the same network access point or two or more different network access points.

Similarly, receive chain 108 may receive y(t) at time t, which may be part of a sequence of receive chain signals y(t), y(t−1), y(t−2), y(t−3), etc., where each of previous transmit chain signals y(t−1), y(t−2), y(t−3), etc., are received at respective past times t−1, t−2, t−3. Accordingly, at any given time t, transmit chain 106 may transmit current transmit chain signal X(t) and receive chain 108 may receive current receive chain signal y(t). In vector notation, the sequence of current and past receive chain signals y(t), y(t−1), y(t−2), y(t−3), . . . , etc., at time t may be denoted as y(t), where y(t)=[y(t), y(t−1), y(t−2), y(t−3), . . . ].

It is appreciated that transmit chain 106 and receive chain 108 may be associated with the same or different radio access technologies. For example, the leakage mitigation application detailed herein may be relevant to multi-radio coexistence or to more conventional self-interference.

Each of receive chain signals y(t) may contain downlink information received from one or more network access points, such as e.g. one or more base stations. Accordingly, each of receive chain signals y(t), y(t−1), y(t−2), y(t−3), . . . , etc., may respectively contain desired signals $y_0(t)$, $y_0(t-1)$, $y_0(t-2)$, $y_0(t-3)$, . . . , etc.

However, due to imperfect isolation between transmit chain 106 and receive chain 108, leakage signal $y_L(t)$ may leak from transmit chain 106 to receive chain 108 over leakage path 110. Accordingly, a receive chain signal y(t) received at any given time t may be equal to $y(t)=y_0(t)+y_L(t)$, as shown in receive chain 108. Desired signal $y_0(t)$ may therefore be corrupted by the presence of leakage signal $y_L(t)$. If left uncompensated, the presence of leakage signal $y_L(t)$ may lead to poor reception quality. It is appreciated that receive chain signal y(t) may include further signal components related to noise, interference, etc., which are not explicitly denoted above and have been omitted for purposes of explanation.

Leakage cancellation processor 112 may remove leakage from receive chain signal y(t). It may be assumed that leakage signal $y_L(t)$ is related to transmit chain signals X(t). Accordingly, leakage cancellation processor 112 may utilize current transmit signal X(t) along with previous transmit chain signals X(t), X(t−1), X(t−2), X(t−3), . . . , etc., in order to obtain a leakage signal estimate $\hat{y}_L(t)$ that is an approximation of actual leakage signal $y_L(t)$. Leakage cancellation processor 112 may derive a leakage signal estimate $\hat{y}_L(t)$ at 120 at each time t based on the current and past transmit chain signals X(t), and may subsequently utilize leakage signal estimate $\hat{y}_L(t)$ to substantially cancel all or part of actual leakage signal $y_L(t)$ from current receive chain signal y(t). Leakage cancellation processor 112 may perform this cancellation at 122, where leakage cancellation processor 112 may subtract leakage signal estimate $\hat{y}_L(t)$ from receive chain signal y(t) in order to generate cleaned receive chain signal $\hat{y}_0(t)$ at 124, where $\hat{y}_0(t)=y(t)-\hat{y}_L(t)=y_0(t)+y_L(t)-\hat{y}_L(t) \cong y_0(t)$. The application of accurate leakage signal estimates $\hat{y}_L(t)$ at 122 that are substantially equal to actual leakage signals $y_L(t)$ may therefore yield cleaned receive chain signals $\hat{y}_0(t)$ that contain substantially only desired signals $y_0(t)$, thereby providing a high quality of downlink data reception.

Leakage cancellation processor 112 may approximate actual leakage signal $y_L(t)$ in an exemplary implementation using current transmit chain signal X(t) in addition to previous transmit chain signals X(t−1), X(t−2), X(t−3), . . . , X(t−$L_0$) shown in receive chain 106, where $L_0$ is e.g. a memory length or past transmit chain buffer length. In recognition thereof, transmit signal vector X(t) therefore be finitely limited as a vector of length $L_0$+1 where X(t)=[X(t), X(t−1), X(t−2), X(t−3), . . . , X(t−$L_0$)]. It is appreciated that the vector and/or matrix notations utilized herein are exemplary in nature and are employed solely for purposes of explanation. Accordingly it is understood that the approaches detailed in this disclosure are not limited to being implemented solely using vectors and/or matrices, and that the associated processes and computations may be equivalently performed with respect to sets, sequences, groups, etc., of signals.

However, actual leakage signal $y_L(t)$ may not be a linear function of the transmit signals of transmit signal vector X(t). As previously detailed, this non-linearity may be introduced into leakage path through physical components such as delays, filters, and/or non-linear amplifiers in addition the use of a different frequency band for transmission (i.e. by transmit chain 106) and reception (i.e. by receive chain 108). Accordingly, this non-linearity may appreciably render it unfeasible to directly apply linear estimation techniques on transmit signal vector X(t) in order to produce a valid leakage signal estimate $\hat{y}_L(t)$.

Leakage cancellation processor 112 may apply kernelization functions to the elements of transmit signal vector X(t) in order to produce a set of kernels at 114 that may be assumed to share a linear relationship with actual leakage signal $y_L(t)$. Accordingly, an leakage cancellation processor 112 may apply an appropriate set of K kernelization functions (expressed here in vector notation) $\Phi=[\phi_1, \phi_2, \ldots, \phi_K]$ to current transmit signal vector X(t)=[X(t), X(t−1), X(t−2), X(t−3), . . . , X(t−$L_0$)] at time t in order to generate a set of kernels $\Phi(t)=[\phi_1(t), \phi_2(t), \ldots, \phi_K(t)]$ at 114, where each kernel in $\Phi(t)$ is based on one or more transmit signal vectors in X(t). As will be later detailed, each kernelization function $\phi_k$ of $\Phi$ may be a predefined function of one or more elements of X(t). It may then be assumed that leakage signal estimate $\hat{y}_0(t)$ is a linear function of the kernels $\Phi(t)=[\phi_1(t), \phi_2(t), \ldots, \phi_K(t)]$.

As $\hat{y}_L(t)$ at a given time t is a linear combination of the kernels $[\phi_1(t), \phi_2(t), \ldots, \phi_K(t)]$, a parameter set W=[$w_1$, $w_2$, . . . , $w_k$] may be determined at 116 through system identification such that leakage signal estimate $\hat{y}_L(t)=w_1\phi_1(t)+w_2\phi_2(t)+ \ldots +w_K\phi_K(t)$. The parameter set W may thus model the linear relationship between kernel set $\Phi(t)$ and leakage signal estimate $\hat{y}_L(t)$, and may be generated by applying linear estimation techniques on observations (i.e. transmit chain signals X(t) and receive chain signals y(t)). It is appreciated that parameter set W may be determined using estimation techniques, and may be adapted and/or updated based on new transmit chain signals X(t) and receive chain signals y(t).

Leakage cancellation processor 112 may then apply the determined parameter set W to kernels $\Phi(t)$ at 118 in order to generate leakage signal estimate $\hat{y}_L(t)=W'\cdot\Phi(t)=w_1\phi_1(t)+w_2\phi_2(t)+ \ldots +w_K\phi_K(t)$ at 120, where W' is the transpose of parameter vector W. Receive chain signal y(t) at time t may then be cleaned using $\hat{y}_L(t)$ at 122 to produce cleaned receive chain signal $\hat{y}_0(t)$ at 124.

Selection of an effective set of kernel functions to generate kernels $\Phi(t)$ at 114 may dramatically improve the system identification process in any application of linear estimation techniques to non-linear systems. Accordingly, numerous different types of kernel functions and variations thereof have been applied in a wide array of applications.

In particular, polynomial kernels and, and in a more general format, Volterra series kernels have seen widespread use in interference mitigation applications. Polynomial kernels take the form as follows:

$$X(t-\tau)|X(t-\tau)|^{k-1} \quad (1),$$

where X(t) is transmit chain signal at time t, $\tau$ is an integer such that $\tau \geq 0$, and k is an integer such that k>0.

Accordingly, a polynomial kernel taking the form denoted in Equation 1 may be calculated based on a single current or previous (i.e. $\tau$=0 or $\tau$>0, respectively) transmit chain signal X(t−$\tau$). It is appreciated that the finite length $L_0$ of a memory in a real-world implementation may limit $\tau$ to $0 \leq \tau \leq L_0$. Furthermore, the non-linear relationship existing between transmit chain signals X(t) and actual leakage signal $y_L(t)$ may be addressed through the application of exponential values k such that k>1, thereby producing a kernel that is non-linear with transmit chain signal X(t−$\tau$).

Volterra series kernels are similar in form to that of polynomial kernels, and take the form (in baseband format) as follows:

$$X(t-\tau_1)|X(t-\tau_1)|^{k_1}|X(t-\tau_2)|^{k_2} \ldots |X(t-\tau_N)|^{k_N} \quad (2),$$

where $\tau_i$ and $k_i$, i={1, 2, . . . , N}, are non-negative integers such that $\tau_i \geq 0$ and $k_i \geq 0$.

As previously indicated, both polynomial and Volterra series kernels have been applied to interference mitigation applications such as the self-interference cancellation application related to transmit chain leakage emphasized herein. However, there are two problems associated with polynomial and Volterra series kernels. First, the kernels are not "orthogonal" to each other, i.e. the correlation between each of the kernels is not zero. Accordingly, there may exist some degree of dependency (i.e. by virtue of correlation) between the kernels, which may in turn complicate the system identification process. As a result, the weights contained in parameter set W may be negatively affected.

Second, the exponential format of the polynomial and Volterra series kernels may lead to numerical issues in cases where large exponents are applied. For example, high order kernels characterized by relatively large values of $k_i$ may have high dynamic range and high peak-to-average-power ratio (PAPR).

The aforementioned weaknesses of polynomial and Volterra series kernels may lead to determination of a sub-optimal parameter vector W and to numerical complexity issues that ultimately reduce the efficiency of the system identification process.

In contrast to the non-orthogonal associated with polynomial and Volterra series kernelization functions, kernels based on complex exponentials may be able to provide a resulting kernel set containing statistically orthogonal kernels. Furthermore, such complex exponential-based kernels may also avoid numerical issues by offering phase rotation as an alternative computation approach to the evaluation of exponential expressions required by higher-order polynomial and Volterra series kernels.

The complex exponential-based kernels may be derived based on Fourier series expansion theory, which allows for almost all periodic function to be decomposed into a summation of orthogonal waveforms. Accordingly, a periodic function $g_{T_0}(t)$ with period $T_0$ may be expanded into a sum of weighted harmonics (i.e. complex exponential) with fundamental frequency $f_0=1/T_0$. The Fourier series expansion of $g_{T_0}(t)$ may be mathematically expressed as follows:

$$g_{T_0}(t) = \sum_{n=-\infty}^{\infty} c_n \exp(j2\pi t f_0), \quad (3)$$

where $c_n$, $-\infty \leq n \leq \infty$, are the weighting coefficients associated with the weighted harmonics and $\exp(\cdot)$ denotes the exponential function.

In general, $g_{T_0}(t)$ need not be strictly periodical in order for approximation using Fourier series expansion to be applicable. Accordingly, Equation 3 may still be applied to transmit chain signal X(t).

Specifically, Fourier series expansion may be applicable to signals with limited dynamic range. It may be assumed that X(t) has dynamic range given by $|X(t)| \leq A_0$, where $A_0$ defines the dynamic range of X(t).

Based on this conclusion, appropriate kernels for approximating the non-linear relationship between X(t) and $y_L(t)$ may be derived based on the harmonics associated with Fourier series expansion. These complex exponential-based kernels may be defined as follows:

$$\exp(j\theta_{X(t-\tau)}) \exp\left(\frac{j2\pi k |X(t-\tau)|}{A_0}\right), \quad (4)$$

where k and τ are integers such that k is any integer, $\tau > 0$, $A_0$ is the dynamic range of X(t) as previously indicated, and $\theta_{X(t)}$ denotes the phase of X(t).

Similar to the phase information of X(t) contained in the leading term X(t−τ), the kernels given by Equation 4 may capture phase information of X(t) in the leading term $\exp(j\theta_{X(t-\tau)})$.

Furthermore, the term $$\exp\left(\frac{j2\pi k |X(t-\tau)|}{A_0}\right)$$

in Equation 4 produces kernels for different values of k that are almost orthogonal to one another over the range $[0, A_0]$. In other words, the correlation between $$\exp\left(\frac{j2\pi k_1 |X(t-\tau)|}{A_0}\right)$$

and $$\exp\left(\frac{j2\pi k_2 |X(t-\tau)|}{A_0}\right)$$

for any two given values $k_1$ and $k_2$, $k_1 \neq k_2$ will be nearly zero.

Accordingly, kernels associated with Equation 4 may be nearly orthogonal to one another. In addition, the exponent k of the classical polynomial kernels in Equation 1 is instead located in the exponential term of a complex exponential. As a result, the numerical issues associated with evaluation of high-order exponential expressions may be avoided, as kernels of the format given in Equation 4 with relatively high values for k may be evaluated using phase rotation.

A more general format of Equation 4 corresponding to the Volterra series kernels of Equation 2 may be given as follows:

$$\exp(j\theta_{X(t-\tau_1)})\exp\left(\frac{j2\pi k_1 |X(t-\tau_1)|}{A_0}\right)\exp\left(\frac{j2\pi k_2 |X(t-\tau_2)|}{A_0}\right) \ldots \quad (5)$$
$$\exp\left(\frac{j2\pi k_N |X(t-\tau_N)|}{A_0}\right),$$

where $k_i$ and $\tau_i$, $i=\{1, 2, \ldots, N\}$, are non-negative integers such that $k_i$ is any integer and $\tau_i \geq 0$.

Equation 4 maybe considered a special case of Equation 5. Similarly to as detailed regarding Equation 4, Equation 5 may contain phase information of X(t) in the leading term $\exp(j\theta_{X(t-\tau_1)})$ in addition to producing nearly orthogonal kernels for varying values of $k_i$. Accordingly, kernels taking the form of Equation 5 may offer an improvement in system identification accuracy and reduced complexity over the existing Volterra series kernel format.

Equation 5 may be equivalently written in an alternative form as follows:

$$\exp(j\theta_{X(t-\tau_1)})\exp\left(\frac{j2\pi(k_1|X(t-\tau_1)|+k_2|X(t-\tau_2)|+\ldots+k_N|X(t-\tau_N)|)}{A_0}\right). \quad (6)$$

The improved set of complex exponential-based kernels provided by Equations 4 and 5 may therefore be utilized in order to approximate the non-linear relationship between transmit chain signals X(t) and an actual leakage signal $y_L(t)$. Accordingly, the complex exponential-based kernel functions of Equation 4 and Equation 5 may be applied to one or more elements of X(t) (i.e. based on the relevant values used for τ and $\tau_i$) in order to generate a set of kernels Φ(t) that may be assumed to be linearly related to $y_L(t)$, i.e. where $y_L(t)$ is a substantially linear combination of the kernels Φ(t). Accordingly, a parameter vector W may be determined that gives the relationship between kernel set Φ(t) and a leakage signal estimate $\hat{y}_L(t)$ as $\hat{y}_L(t)=W^T \cdot \Phi(t)$ at time t. Leakage cancellation may be realized by applying the obtained leakage estimate $\hat{y}_L(t)$ to receive chain signal y(t) in order to obtain cleaned receive chain signal $\hat{y}_0(t)$, which may substantially contain desired signal $y_0(t)$.

Figure 2:
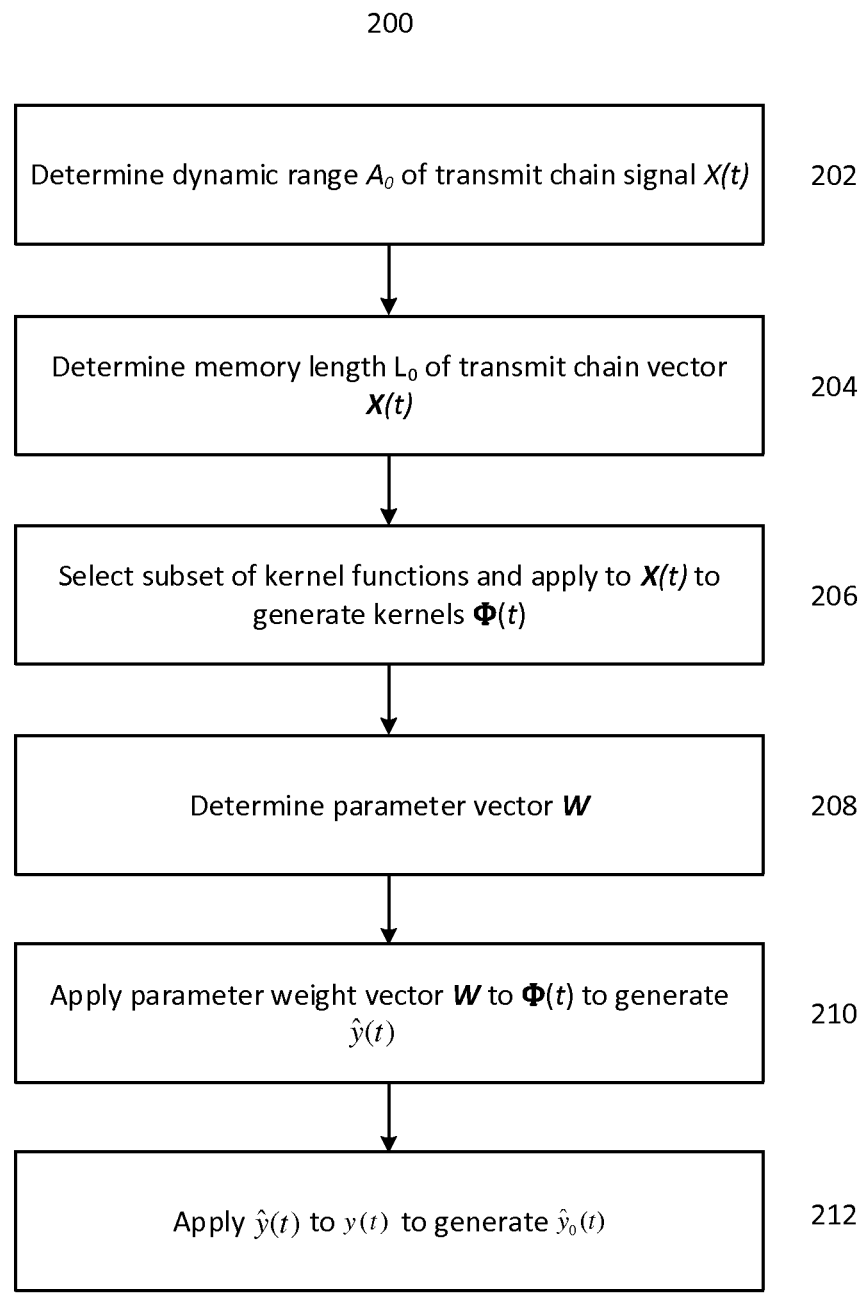
FIG. 2 shows a flow diagram illustrating a leakage cancellation process.

FIG. 2 shows a flow chart illustrating method 200. Similarly to as detailed above regarding mobile system 100, method 200 may be applied to leakage cancellation.

Specifically, method 200 may seek to create a linear model to accurately characterize the non-linear relationship between signals transmitted from a transmit chain of a transceiver device (such as e.g. transmit chain 106 of mobile system 100) and a resulting leakage signal found in a signal received by a receive chain of the transceiver device (such as e.g. receive chain 108 of mobile system 100). As will be described, method 200 may utilize kernelization functions based on complex exponentials in order to derive a linear system between a set of kernels generated from current and past transmit chain signals and the resulting leakage signal. Method 200 may then solve this system using linear approximation in order to derive a set of parameters that characterize the aforementioned linear system, thereby obtaining a medium with which to estimate and subsequently cancel leakage.

Method 200 may denote the signal received at the receive chain at time t as $y(t)=y_0(t)+y_L(t)$, where $y_0(t)$ is a desired signal contained in receive chain signal $y(t)$ and $y_L(t)$ is the actual leakage signal. It is assumed that $y_L(t)$ depends on one or more of current and past transmit chain signals $\{X(t), X(t-1), X(t-2), \ldots\}$ according to a non-linear relationship. Method 200 may therefore generate a leakage signal estimate $\hat{y}_L(t)$ based on one or more of transmit chain signals $\{X(t), X(t-1), X(t-2), \ldots\}$.

Method 200 may first a the dynamic range $A_0$ of the transmit chain signal $X(t)$ in 202, where $A_0=\max|X(t)|$, i.e. the maximum amplitude of $X(t)$ over all time t. As previously discussed regarding Fourier series expansion theory, a Fourier series expansion may still be applicable to a non-periodic signal if the non-periodic signal has limited dynamic range.

Method 200 may then select a finite number of transmit chain signals $\{X(t), X(t-1), X(t-2), \ldots\}$ to base the determination of leakage signal estimate $\hat{y}_0(t)$ on in 204. Specifically, method 200 may select a memory length $L_0$ and subsequently generate transmit chain signal vector $X(t)$ as $X(t)=[X(t), X(t-1), X(t-2), \ldots, X(t-L_0)]$, i.e. may select the most recent $L_0+1$ transmit chain signals as elements of transmit chain signal vector $X(t)$.

Method 200 may then select a subset of kernelization functions to apply to transmit chain signal vector $X(t)=[X(t), X(t-1), X(t-2), \ldots, X(t-L_0)]$ in 206. The complete set of kernelization functions may be given by Equation 4 and Equation 5 for all integer-valued k and $t \geq 0$ and all integer-valued $k_i$ and $\tau_i \geq 0$, $i=\{1, 2, \ldots, N\}$, respectively.

Accordingly, a subset of K total kernels $\Phi(t)=[\phi_1(t), \phi_2(t), \ldots, \phi_K(t)]$ may be selected using different values k, $\tau$, $k_i$, and $\tau_i$ for Equations 4 and 5, where each kernelization function is based on one or more elements of transmit chain signal vector $X(t)$. This selection may be accomplished in a variety of different options, such as in accordance with a classical method. For example, a potential kernel subset may be derived from Equation 1 using $k=\{-4, -3, \ldots, 1, 2, 3, 4\}$ and $\tau=\{0, 1, 2, 3, 4\}$.

In 208, method 200 may determine parameter vector W characterizing the linear system $y_L(t)=W'\Phi(t)$, where $W=[w_1, w_2, \ldots, w_K]$. Method 200 may perform 208 using a linear estimation technique, such as LMS, RLS, conjugate gradient (CG), coordinate descent (CD), etc. Each weighting parameter $\{w_1, w_2, \ldots, w_K\}$ may therefore correspond to a respective kernel $\{\phi_1(t), \phi_2(t), \ldots, \phi_K(t)\}$ in order to approximate $y_L(t)$ as leakage signal estimate $\hat{y}_L(t)=w_1\phi_1(t)+w_2\phi_2(t)+ \ldots +w_K\phi_K(t)$.

After determining parameter vector W in 208, method 200 may apply parameter vector W to kernels $\Phi(t)$ in 210 to generate leakage signal estimate $\hat{y}_L(t)$. Method 200 may then apply leakage signal estimate $\hat{y}_L(t)$ to a subsequently received receive chain signal $y(t)$ in order to remove leakage in 212, thereby producing a cleaned receive chain signal $\hat{y}_0(t)$ that substantially contains desireds signal $y_0(t)$, i.e. $\hat{y}_0(t) \approx y_0(t)$.

Regarding 208, method 200 may specifically apply by receiving the next transmit chain signal $X(t+1)$, updating kernels $\Phi(t)$ to $\Phi(t+1)$ based on the updated transmit chain signal vector $X(t+1)$, and applying the current parameter vector W determined in relation to time t in order to generate leakage signal estimate $\hat{y}_L(t+1)$. Method 200 may then apply leakage signal estimate $\hat{y}_L(t+1)$ to the next receive chain signal $y(t+1)$ in order to produce cleaned receive chain signal $\hat{y}_0(t+1)$ that is substantially free of self-interference due to leakage.

It is appreciated that method 200 may thus operate in an iterative fashion, and may constantly update the relevant parameters $X(t)$, $\Phi(t)$, W, and $\hat{y}_L(t)$ over time, e.g. at times $t=t+1, t+2, t+3, \ldots$, in order to perform constant leakage mitigation. These updates may be based on new observations to the system, such as new transmit chain signals $X(t)$ and new receive chain signals $y(t)$. 208 of method 200 may thus involve updating and/or adapting one or more parameters of parameter vector W in order to identify accurate parameters for parameter vector W.

As previously detailed, the kernelization functions denoted by Equations 4 and 5 may provide appreciable benefits over the classical polynomial and Volterra series kernelization functions. Kernels produced by Equations 4 and 5 may be almost orthogonal to one another, thereby reducing issues related to derivation of W that are caused by kernels that are relatively correlated with one another. Accordingly, application of complex-exponential kernels such as those given by Equations 4 and 5 may allow for a more straightforward realization of W due to the use of orthogonal kernels. System identification in determining W may thus be improved.

Additionally, kernels given by Equations 4 and 5 are all of unit norm (i.e. PAPR=1), and the absence of high-order exponential expressions in Equations 4 and 5 may directly reduce numerical processing issues. As the exponential parameters k and $k_i$ are located in the exponent of a complex exponential in Equations 4 and 5, higher-order kernels may be generated using simple phase rotation of lower-order kernels. In contrast, polynomial kernels may result in kernels with different order that are powers of one another and each have dramatically different dynamic range, which may appreciably increase computational complexity. The kernels of Equations 4 and 5 may therefore reduce such issues in practical implementations.

It is appreciated that the kernels given by Equations 4 and 5 are naturally almost orthogonal to each other, and accordingly little or no additional orthogonalization processing may be necessary. In contrast, matrix transformation operations may be required when utilizing polynomial kernels in order to normalize the kernels to one another. While kernel orthogonalization may result in improved performance, such as increased interference mitigation in the application emphasized herein, supplementary processing is required in order to complete the orthogonalization. Accordingly, kernel orthogonalization may demand increased processing complexity, storage, and power consumption. Additionally, calculation of multiple distinct transformation matrices may be required in order to compensate for different leakage scenarios, such as e.g. leakage in different frequency bands.

As no further orthogonalization may be required in connection with the complex exponential-based kernels given by Equations 4 and 5, similar performance results may be obtained without any added processing. It is appreciated that the kernelization functions detailed herein may be utilized as an alternative to classical kernlization functions such as polynomial and Volterra series kernels in any number of different applications. As effective kernelization functions may be applied to approximate any non-linear system, it is appreciated that the use of the kernelization functions detailed herein may be implemented in the approximation of substantially any non-linear system. Accordingly, the disclosure detailed herein is understood as embracing any system or method utilizing such complex exponential-based kernels, in particular complex exponential-based kernels derived from Fourier expansion theory.

Figure 3:
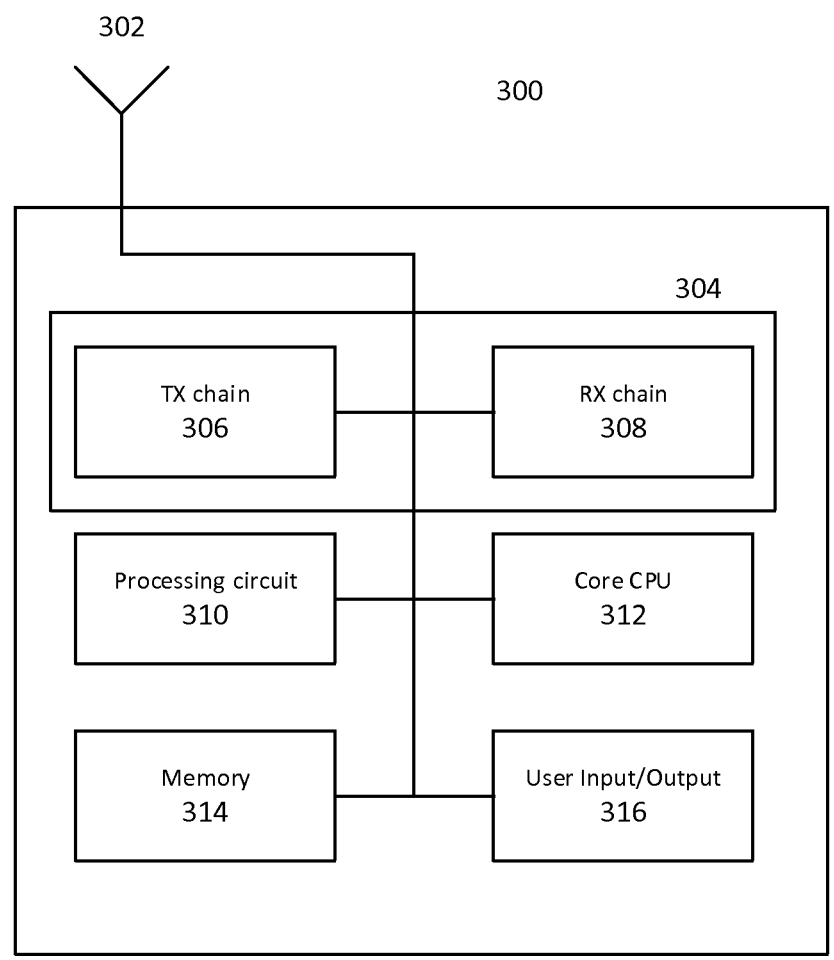
FIG. 3 shows a block diagram illustrating internal components of a communication terminal.

FIG. 3 shows communication terminal 300. Communication terminal 300 may include at least antenna 302, transceiver 304 including transmit chain 306 and receive chain 308, processing circuit 310, core Central Processing Unit (CPU) 312, memory 314, and user input/output 316.

Communication terminal 300 may transmit and receive wireless signals using antenna 302 and transceiver 304. Specifically, transmit chain 306 and receive chain 308 of transceiver 304 may utilize antenna 302 to transmit signals from communication terminal 300 and receive signals at communication terminal 300, respectively, such as by utilizing duplexing circuitry. It is appreciated that antenna 302 may be a single antenna or may be an antenna array composed of a plurality of antennas.

Communication terminal 300 may be configured to perform wireless communications according to any of a number of different radio access technologies. For example, communication terminal 300 may be configured to perform wireless communications according to a cellular communications protocol, such as a 3GPP wireless network e.g. GSM, UMTS, or LTE. Communication terminal 300 may additionally or alternatively be configured to perform wireless communications according to short range communications protocol, such as WiFi or Bluetooth.

Core CPU 312 may be utilized to support core functionality of communication terminal 300, such as by supporting one or more radio access technologies. Core CPU 312 may thus be configured to execute a protocol stack according to the one or more supported radio access technologies. Core CPU 312 may include audio processing circuits, such as audio encoding and/or audio decoding circuits. Core CPU 312 may act a controller, and may be configured to control one or more of the additional components of communication terminal 300. Core CPU 312 may be implemented as e.g. a microprocessor or any other type of programmable logic. Core CPU 312 may be configured to execute one or more software routines, such as one or more software routines associated with program code stored in memory 314. It is appreciated that processing circuit 310 may be implemented as a component of core CPU 312.

As shown in FIG. 3, communication terminal 300 may further include memory 314. Memory 314 may be composed of e.g. a read only memory (ROM) and/or a random access memory (RAM). Memory 314 additionally may be composed of several separately implemented memory components, and may be available for use by one or more further components of communication terminal 300. Memory 314 may additionally store one or more sets of program code, such as program code utilized to control core CPU 312 and/or processing circuit 310. Memory 314 may additionally be utilized to store wireless communication data, such as data received by receive chain 308 and/or data intended for transmission by transmit chain 306.

Communication terminal 314 may additionally include components to interact with a user, such as user input/output 316. User input/output 316 may include one or more input and/or output devices, such as keypads, physical buttons, displays, touch sensitive displays, loudspeakers, microphones, cameras, etc.

The internal components of communication terminal 300 may be coupled with one another via one or more lines, such as e.g. one or more data buses. Accordingly, one or more of the internal components of communication terminal 300 may interact with one another by exchanging data therewith. The exchange of data within the internal components of communication terminal 300 may be controlled by e.g. core CPU 312.

Similarly to mobile device 100, as communication terminal 300 may include transceiver components (transceiver 304), communication terminal 300 may be susceptible to leakage from transmit chain 306 to receive chain 308. Accordingly, communication terminal 300 may be configured to mitigate and/or cancel transmit chain leakage from signals received by receive chain 308.

Communication terminal 300 may therefore be configured to generate an estimated leakage signal based on a signal intended for transmission over transmit chain 306. Communication terminal 308 may then utilize the estimated leakage signal to mitigate and/or cancel an actual leakage signal from a signal received by receive chain 308.

Communication terminal 300 may therefore be provided with processing circuit 310, which may interact with transmit chain 306 and receive chain 308 in order to mitigate and/or cancel leakage from signals received by receive chain 308.

Transmit chain 306 may therefore be configured to transmit one or more transmit signals. Receive chain 308 may be configured to receive one or more receive signals.

Communication terminal 300 may be considered a transceiver device as communication terminal includes transceiver 304. Communication terminal 300 may thus include a transmitter (transmit chain 306) associated with a transmit signal sequence comprising one or more transmit signals and a receiver (receive chain 308) associated with one or more receive signals, wherein one or more of the receive signals of the receive signal sequence contain signal leakage associated with the one or more transmit signals of the transmit signal sequence.

Communication terminal 300 may further include a processing circuit (processing circuit 310), which may be configured to generate a kernel set comprising one or more kernels based on the transmit signal sequence, wherein a first kernel of the kernel set includes a first complex exponential component of the first kernel based on the phase of a first transmit signal of the transmit signal sequence, and a second complex exponential component of the first kernel based on the amplitude of the first transmit signal of the transmit signal sequence. The processing circuit may be further configured to apply the kernel set to generate a solution to a linear system, wherein the solution to the linear system represents a substantially linear relationship between the kernel set and the signal leakage associated with the one or more transmit signals of the transmit signal sequence.

The solution to the linear system may be a parameter set including one or more parameters. Processing circuit 310 may thus be further configured to apply the parameter set to one or more transmit signals of the transmit signal sequence to generate a signal leakage estimate, and apply the signal leakage estimate to a first receive signal of the receive signal sequence to remove the signal leakage from the first receive signal of the receive signal sequence.

Communication terminal 300 may thus be configured to mitigate and/or cancel transmit chain leakage from signals receive by receive chain 308.

Figure 4:
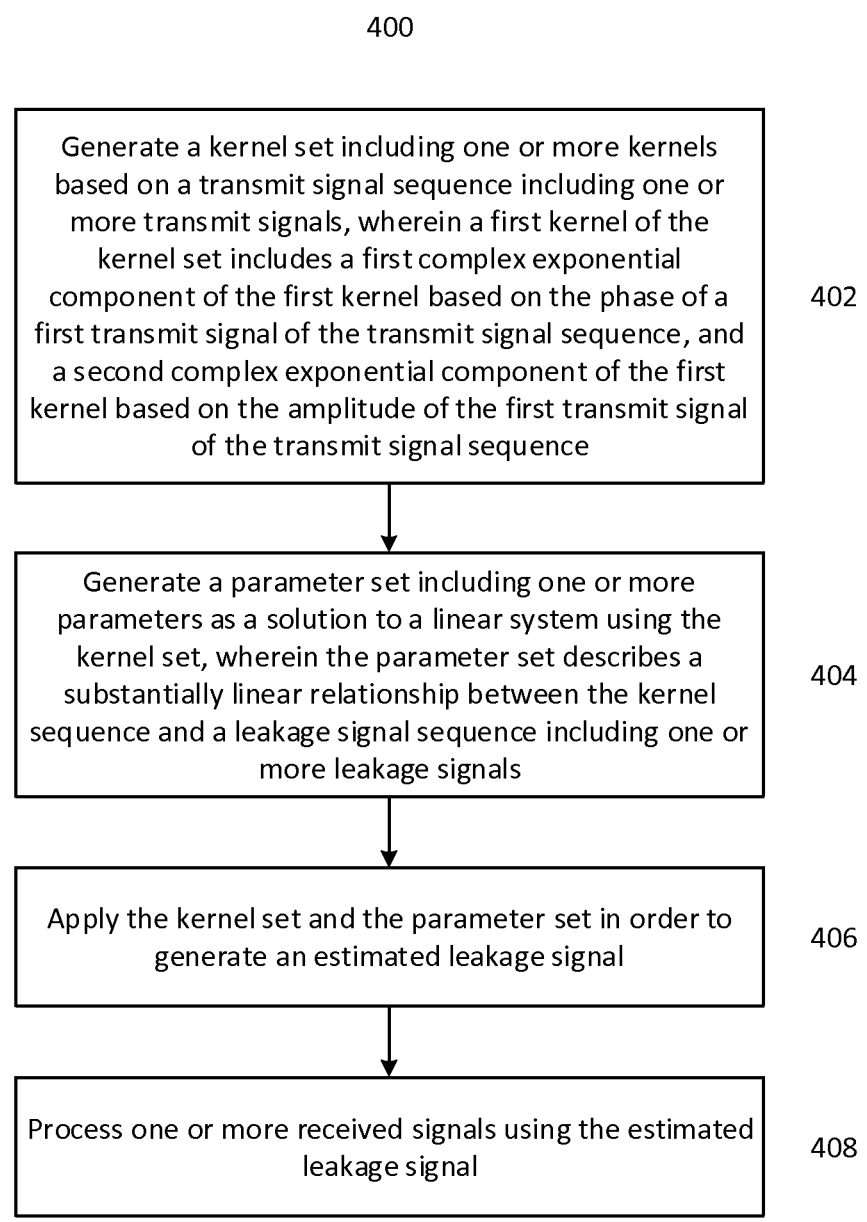
FIG. 4 shows a flow diagram illustrating a method of processing signals.

FIG. 4 shows method 400. Method 400 is a method of processing signals. In 402, method 400 may generate a kernel set including one or more kernels based on a transmit signal sequence comprising one or more transmit signals, wherein a first kernel of the kernel set includes a first complex exponential component of the first kernel based on the phase of a first transmit signal of the transmit signal sequence, and a second complex exponential component of the first kernel based on the amplitude of the first transmit signal of the transmit signal sequence vector. In 404, method 400 may generate a parameter set including one or more parameters as a solution to a linear system using the kernel set, wherein the parameter set represents a substantially linear relationship between the kernel set and a leakage signal sequence comprising one or more leakage signals. Method 400 may then apply the kernel set and the parameter set in order to generate an estimated leakage signal 406. In 408, method 400 may process one or more received signals using the estimated leakage signal.

It is appreciated that one or more kernels of the kernel set of method 400 may take similar form as to one of Equations 4, 5, or 6, and thus may be based on complex exponential components, where the phase of each complex exponential component has a phase dependent on the phase or amplitude of a signal of the first signal sequence.

Method 400 is thus understood as being applicable to any of a variety of non-linear system estimation applications. In particular, method 400 may be applicable to non-linear system estimation applications that utilize kernels and/or kernel functions to generate an estimated linear system from a non-linear system. In the exemplary applications detailed herein, method 400 may be applied to leakage cancellation in transceiver devices, i.e. in order to generate a linear system describing the relationship between transmit chain signals and leakage contained in receive chain signals by applying kernelization functions to the transmit chain signals. It is appreciated that such techniques involving the application of kernels to signals of a first signal type to estimate a linear relationship between signals of the first signal type and signals of a second type may be improved through the use of method 400.

Figure 5:
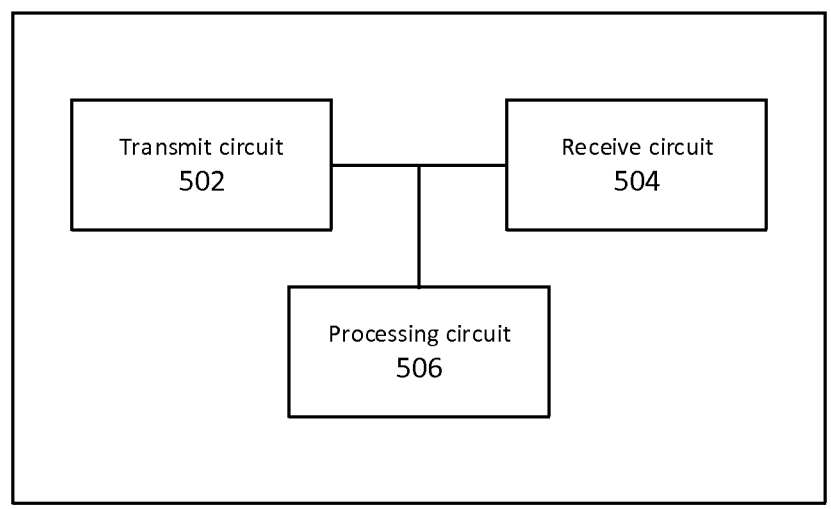
FIG. 5 shows a block diagram illustrating internal components of a data processing system.

FIG. 5 shows data processing system 500. Data processing system may include a transmit circuit (receive circuit 502), a receive circuit (receive circuit 504), and a processing circuit (processing circuit 506).

The transmit circuit may be configured to transmit a first signal sequence including one or more signals. The receive circuit may be configure to receive a second signal sequence including one or more additional signals, wherein one or more further signals of the second signal sequence comprise an interference component arising from the first signal sequence.

The processing circuit may be configured to generate a kernel set including one or more kernels based on the first signal sequence, wherein a first kernel of the kernel set includes a first complex exponential component of the first kernel based on the phase of a first signal of the first signal sequence, and a second complex exponential component of the first kernel based on the amplitude of the first signal of the first signal sequence, and apply the kernel set to generate a solution to a linear system, wherein the solution to the linear system represents a substantially linear relationship between the kernel set and the interference component of the second signal sequence arising from the first signal sequence.

Data processing system 500 may thus estimate the relationship between signals associated with the transmit circuit and signals associated with the receive circuit. The transmit circuit may be a wireless transmitter and the receive circuit may be a wireless receiver. However, it is appreciated that data processing system 500 may relate to any two circuits where signals associated with a first circuit are related to signals associated with a second circuit. In particular, data processing system 500 may be applicable to any two circuits with associated signals that are related according to a non-linear relationship. Data processing 500 may thus be capable of estimating the non-linear relationship between any two circuits or similar electronic devices, in particular between signals corresponding to two circuits that are non-linearly related. Data processing system 500 may be applied in order to estimate the non-linear relationship, such as by utilizing kernel functions as detailed in Equations 4, 5, and 6, thereby obtaining a linear system that models the relationship between the two circuits. The linear system may then be solved e.g. using linear estimation processing, thereby providing an approach to compensate for the non-linear relationship in a number of different manners.

It is appreciated that the applications relevant to this disclosure are not intended to be limited to those explicitly detailed herein. Accordingly, it is understood that the techniques and instruments detailed herein may be implemented to estimate non-linear relationships of substantially all varieties, and all such applications are thus fully embraced, including e.g. non-linear electrical relationships, non-linear mechanical relationships, non-linear chemical relationships, non-linear structural relationships, etc.

Accordingly in an exemplary aspect of the disclosure, a method may include generating a kernel set comprising one or more kernels based on a first data set comprising one or more data elements of a first type, wherein a first kernel of the kernel set is composed of a first complex exponential component of the first kernel based on a first data element of the first data set. The method may further include generating a solution to a linear system to using the kernel set, wherein the solution represents a substantially linear relationship between the kernel set and a second data set comprising one or more data elements of a second type.

The relationship between the first data set and the second data set may be non-linear, and thus the related method may utilize the kernel set comprising at least the first kernel to generate a linear system representing a linear relationship between the kernel set and the second data set. The method may then generate a solution to the linear system, such as e.g. using a linear estimation technique (e.g. RLS, LMS, CG, CD, etc.), thereby obtaining an estimated solution to the initial non-linear system between the first data set and the second data set by generating a linear system using the kernel set.

The first complex exponential component of the first kernel of the kernel set may be based on the phase of the first data element of the first data set. The first kernel of the kernel set may further comprise a second complex exponential component, which may be based on the amplitude of the first data element of the first data set. The first kernel of the kernel set may comprise one or more further complex exponential components based on one or more additional data elements of the first data set, such as e.g. one or more further complex exponential components based on the amplitude of one or more additional elements of the first data set.

Additional kernels of the kernel set may be of similar form as to the first kernel of the kernel set, and thus may be composed of one or more complex exponential components based on the amplitude or phase of one or more further data elements of the first data set. It is appreciated that one or more kernels of the kernel set may thus be substantially naturally orthogonal to one another.

The solution to the linear system may be a parameter set comprising one or more parameters. The parameter set may thus model the relationship between the kernel set and the second data set, and may be used for a variety of further operations, such as e.g. performing compensating operations in a system associated with the first data set and the second data set. The parameter set may be utilized to generate one or more estimated additional data elements of the first data type based on the kernel set. The compensating operations in the system associated with the first data set and the second data set may then be performed using the one or more estimated additional data elements. The parameter set, kernel set, first data set, and/or second data set may be updated based on one or more observations.

The above-detailed method may be executed in processing circuitry, which may comprise software, hardware, or a combination of hardware and software. In an exemplary aspect, the method may be executed as software. Accordingly, an exemplary aspect of the disclosure may provide a non-transitory computer readable medium causing a computer to execute the above-detailed method. In one or more further exemplary aspects, one or more processes of the above-detailed method may be implemented as software, while one or more additional processes of the above-detailed method may be implemented as hardware. It is appreciated that such nuances will be appreciated by a skilled artisan and implemented accordingly.

The following examples pertain to further aspects of the disclosure:

Example 1 is a data processing system. The data processing system includes a transmit circuit configured to transmit a first signal sequence including one or more signals, a receive circuit configured to receive a second signal sequence including one or more additional signals, wherein one or more additional signals of the second signal sequence include an interference component arising from the first signal sequence, and a processing circuit configured to generate a kernel set including one or more kernels based on the first signal sequence, wherein a first kernel of the kernel set includes a first complex exponential component of the first kernel based on the phase of a first signal of the first signal sequence, and a second complex exponential component of the first kernel based on the amplitude of the first signal of the first signal sequence, and apply the kernel set to generate a solution to a linear system, wherein the solution to the linear system represents a substantially linear relationship between the kernel set and the interference component of the second signal sequence arising from the first signal sequence.

In Example 2, the subject matter of Example 1 can optionally include wherein the transmit circuit is a wireless transmitter configured to transmit the one or more signals of the first signal sequence and the receive circuit is a wireless receiver configured to receive the one or more additional signals of the second signal sequence.

In Example 3, the subject matter of Example 1 or 2 can optionally include wherein the processing circuit is configured to apply the solution to the linear system to remove signal leakage contained in the one or more additional signals of the second signal sequence, wherein the signal leakage is associated with one or more signals of the first signal sequence.

In Example 4, the subject matter of Example 3 can optionally include wherein the processing circuit is configured to apply the solution to the linear system to remove corruption from desired data traffic contained in one or more signals of the second signal sequence.

In Example 5, the subject matter of any one of Examples 1 to 3 can optionally include wherein the transmit circuit is configured to transmit each of the signals of the first signal sequence is at a different transmission time.

In Example 6, the subject matter of Example 2 can optionally include wherein the processing circuit is configured to generate the solution to the linear system as a parameter set that represents a substantially linear relationship between the first signal sequence and the interference component of the second signal sequence.

In Example 7, the subject matter of Example 6 can optionally include wherein the processing circuit is further configured to apply the parameter set to one or more signals of the first signal sequence to generate a signal leakage estimate, and apply the signal leakage estimate to a first signal of the second signal sequence to remove signal leakage from the first signal of the second signal sequence.

In Example 8, the subject matter of Example 7 can optionally include wherein the processing circuit is configured to apply the signal leakage estimate to a first signal of the second signal sequence to remove signal leakage from the first signal of the second signal sequence by subtracting the signal leakage estimate from the first signal of the second signal sequence.

In Example 9, the subject matter of any one of Examples 1 to 8 can optionally include wherein the relationship between the signal component and the first signal sequence is non-linear, and wherein the processing circuit is configured to generate the kernel set wherein the relationship between the interference component and the signal component is substantially linear.

In Example 10, the subject matter of any one of Examples 1 to 9 can optionally include wherein the processing circuit is configured to apply the kernel set to generate a solution to a linear system by applying linear estimation processing to the linear system, wherein the linear system is based on the first signal sequence and the interference component arising from the first signal sequence.

In Example 11, the subject matter of Example 10 can optionally include wherein the processing circuit is configured to apply linear estimation processing by applying at least one of recursive least squares estimation, least mean squares estimation, conjugate gradient, or coordinate descent to the linear system.

In Example 12, the subject matter of Example 11 can optionally include wherein the transmit circuit is configured to transmit each of the signals of the first signal sequence at a respective transmission time and wherein the receive circuit is configured to receive each of the additional signals of the second signal sequence at a respective reception time.

In Example 13, the subject matter of Example 12 can optionally include wherein the transmit circuit is configured to transmit each of the signals of the first signal sequence at a respective transmission time that corresponds to a respective reception time of one of the additional signals of the second signal sequence.

In Example 14, the subject matter of Example 1 can optionally include wherein the processing circuit is configured to generate the first kernel wherein the phase of first complex exponential component of the first kernel is based on the phase of the first signal of the first signal sequence and the phase of the second complex exponential component of the first kernel is based on the amplitude of the first of the first signal of the first signal sequence.

In Example 15, the subject matter of Example 1 can optionally include wherein the processing circuit is configured to generate the first kernel as the product of the first complex exponential component of the first kernel and the second complex exponential component of the first kernel.

In Example 16, the subject matter of any one of Examples 1, 14, or 15 can optionally include wherein the processing circuit is configured to generate the first kernel based on the first signal sequence according to the expression $\exp(j\theta_{X(t-\tau)})\exp(j2\pi k|X(t-\tau)|/A_0)$, where j is the imaginary unit, $X(t-\tau)$ is the first signal of the first signal sequence associated with time $t-\tau$, $\theta_{X(t-\tau)}$ is the phase of the first signal of the first signal sequence, $|X(t-\tau)|$ is the magnitude of the first signal of the first signal sequence, $A_0$ is a parameter based on the range of the first signal of the first signal sequence, k is an integer-valued kernel parameter, $\exp(j\theta_{X(t-\tau)})$ is the first complex exponential component of the first kernel, and $\exp(j2\pi k|X(t-\tau)|/A_0)$ is the second complex exponential component of the first kernel.

In Example 17, the subject matter of Example 1 can optionally include wherein the processing circuit is configured to generate the first kernel as the product of the first complex exponential component of the first kernel, the second complex exponential component of the first kernel, and one or more further complex exponential components of the first kernel, wherein each of the second complex exponential component of the first kernel and the one or more further complex exponential components of the first kernel differ in phase according to the amplitude of one or more signals of the first signal sequence.

In Example 18, the subject matter of Example 17 can optionally include wherein the processing circuit is configured to generate each of the second complex exponential component of the first kernel and the one or more further complex exponential components of the first kernel based on the maximum dynamic range of the one or more signals of the first signal sequence.

In Example 19, the subject matter of Example 17 or 18 can optionally include wherein the processing circuit is configured to generate the first kernel based on N signals of the first signal sequence according to the expression $$\exp(j\theta_{X(t-\tau_1)})\exp\left(\frac{j2\pi k_1|X(t-\tau_1)|}{A_0}\right)\exp\left(\frac{j2\pi k_2|X(t-\tau_2)|}{A_0}\right)\ldots$$
$$\exp\left(\frac{j2\pi k_N|X(t-\tau_N)|}{A_0}\right),$$

where j is the imaginary unit, N+1 is the total quantity of complex exponential components of the first kernel, $\exp(j\theta_{X(t-\tau)})$ is the first complex exponential component of the first kernel, $$\exp\left(\frac{j2\pi k_1|X(t-\tau_1)|}{A_0}\right)$$

is the second complex exponential component of the first kernel, $$\exp\left(\frac{j2\pi k_i|X(t-\tau_i)|}{A_0}\right)$$

for i={2, 3, . . . , N}, are the one or more further complex exponential components of the first kernel, $X(t-\tau_1)$ is the first signal of the first signal sequence associated with time $t-\tau_1$, $X(t-\tau_2)$ is a second signal of the first signal sequence associated with time $t-\tau_2$, $X(t-\tau_i)$ for i={3, 4, . . . , N} are one or more further signals of the first signal sequence associated with the one or more further complex exponential components associated with time $t-\tau_i$, $\theta_{X(t-\tau_1)}$ is the phase of the first signal of the first signal sequence, $|X(t-\tau_i)|$ for i={1, 2, . . . , N} are the magnitudes of the N signals of the first signal sequence, $A_0$ is a parameter based on the range of the N signals of the first signal sequence, and $\{k_1, k_2, \ldots, k_N\}$ are integer-valued kernel parameters.

In Example 20, the subject matter of any one of Examples 1 to 19 can optionally include wherein the processing circuit is configured to generate a first complex exponential component of a second kernel of the kernel set based on the phase of a second signal of the first signal sequence, and a second complex exponential component of the second kernel based on the amplitude of the second signal of the first signal sequence.

In Example 21, the subject matter of Example 20 can optionally include wherein the processing circuit is configured to generate a first complex exponential component of each respective kernel of the kernel set based on the phase of a respective signal of the first signal sequence and a second complex exponential component of each respective kernel based on the amplitude of the respective signal of the first signal sequence.

In Example 22, the subject matter of Example 21 can optionally include wherein the processing circuit is configured to generate the kernel set by generating each respective kernel of the kernel set wherein each respective kernel has substantially equal amplitude to the other kernels of the kernel set, wherein each respective kernel is a phase rotation of the other kernels of the kernel set.

In Example 23, the subject matter of Example 20 can optionally include wherein the processing circuit is configured to generate the first kernel wherein the first kernel has substantially equal amplitude to the second kernel, and wherein the first kernel is a phase rotation of the second kernel.

In Example 24, the subject matter of any one of Examples 1 to 23 can optionally include wherein the data processing system is a transceiver component of a mobile communication device.

Example 25 is a transceiver device. The transceiver device includes a transmitter associated with a transmit signal sequence including one or more transmit signals, a receiver associated with a receive signal sequence including one or more receive signals, wherein one or more of the receive signals of the receive signal sequence contain signal leakage associated with the one or more transmit signals of the transmit signal sequence, and a processing circuit configured to generate a kernel set including one or more kernels based on the transmit signal sequence, wherein a first kernel of the kernel set includes a first complex exponential component of the first kernel based on the phase of a first transmit signal of the transmit signal sequence, and a second complex exponential component of the first kernel based on the amplitude of the first transmit signal of the transmit signal sequence, and apply the kernel set to generate a solution to a linear system, wherein the solution to the linear system represents a substantially linear relationship between the kernel set and the signal leakage associated with the one or more transmit signals of the transmit signal sequence.

In Example 26, the subject matter of Example 25 can optionally include wherein the solution to the linear system is a parameter set including one or more parameters, and wherein the processing circuit is further configured to apply the parameter set to one or more transmit signals of the transmit signal sequence to generate a signal leakage estimate, and apply the signal leakage estimate to a first receive signal of the receive signal sequence to remove the signal leakage from the first receive signal of the receive signal sequence.

In Example 27, the subject matter of Example 26 can optionally include wherein the processing circuit is configured to apply the signal leakage estimate to a first receive signal of the receive signal sequence to remove signal leakage from the first receive signal of the receive signal sequence by subtracting the signal leakage estimate from the first receive signal of the receive signal sequence.

In Example 28, the subject matter of any one of Examples 25 to 27 can optionally include wherein the transmitter is configured to transmit each of the transmit signals of the transmit signal sequence at a respective transmission time.

In Example 29, the subject matter of any one of Examples 25 to 28 can optionally include wherein the relationship between the signal leakage contained in the one or more receive signals of the receive signal sequence and the one or more signals of the transmit signal sequence is non-linear, and wherein the processing circuit is configured to generate the kernel set wherein the relationship between the signal leakage contained in the one or more receive signals of the receive signal sequence and the kernel set is substantially linear.

In Example 30, the subject matter of Example 25 can optionally include wherein the processing circuit is configured to apply the kernel set to generate a solution to a linear system by applying the kernel set to generate a parameter set including one or more parameters as a solution to a linear system, wherein the parameter set represents a substantially linear relationship between the one or more kernels of the kernel set and the signal leakage associated with the one or more transmit signals.

In Example 31, the subject matter of Example 30 can optionally include wherein the processing circuit is further configured to apply the parameter set to a one or more transmit signals of the transmit signal sequence to generate a signal leakage estimate, and apply the signal leakage estimate to a first receive signal of the receive signal sequence to remove signal leakage from the first receive signal of the receive signal sequence.

In Example 32, the subject matter of Example 30 or 31 can optionally include wherein the processing circuit is configured to apply the kernel set to generate the parameter set by applying linear estimation processing to a linear system.

In Example 33, the subject matter of Example 25 can optionally include wherein the processing circuit is configured to apply the kernel set to generate a solution to a linear system by applying linear estimation processing to a linear system, wherein the linear system is based on the transmit signal sequence and the signal leakage contained in the one or more receive signals of the receive signal sequence.

In Example 34, the subject matter of Example 33 can optionally include wherein the processing circuit is configured to apply linear estimation processing to the linear system by applying at least one of recursive least squares estimation, least mean squares estimation, conjugate gradient, or coordinate descent to the linear system.

In Example 35, the subject matter of Example 25 can optionally include wherein the transmitter is configured to transmit each transmit signal of the transmit signal sequence at a different transmission time and the receiver is configured to receive each receive signal of the receive signal sequence is associated with a different reception time.

In Example 36, the subject matter of any one of Examples 25 to 35 can optionally include wherein the processing circuit is configure to generate the phase of the first complex exponential component of the first kernel based on the phase of the first transmit signal of the transmit signal sequence and the phase of the second complex exponential component of the first kernel based on the amplitude of the first transmit signal of the transmit signal sequence, and wherein the processing circuit is configured to generate the first kernel as the product of the first complex exponential component of the first kernel and the second complex exponential component of the first kernel.

In Example 37, the subject matter of any one of Examples 25 to 36 can optionally include wherein the processing circuit is configured generate the first kernel based on the transmit signal sequence according to the expression $\exp(j\theta_{X(t-\tau)})\exp(j2\pi k|X(t-\tau)|/A_0)$, where j is the imaginary unit, $X(t-\tau)$ is the first transmit signal of the transmit signal sequence associated with time $t-\tau$, $\theta_{X(t-\tau)}$ is the phase of the first transmit signal of the transmit signal sequence, $|X(t-\tau)|$ is the magnitude of the first transmit signal of the transmit signal sequence, $A_0$ is a parameter based on the amplitude range of the first transmit signal of the transmit signal sequence, k is an integer-valued kernel parameter, $\exp(j\theta_{X(t-\tau)})$ is the first complex exponential component of the first kernel, and $\exp(j2\pi k|X(t-\tau)|/A_0)$ is the second complex exponential component of the first kernel.

In Example 38, the subject matter of Example 25 can optionally include wherein the processing circuit is configured to generate the first kernel as the product of the first complex exponential component of the first kernel, the second complex exponential component of the first kernel, and one or more further complex exponential components of the first kernel, wherein each of the second complex exponential components of the first kernel and the one or more further exponential components of the first kernel differ in phase according to the amplitude of the one or more transmit signals of the transmit signal sequence.

In Example 39, the subject matter of Example 38 can optionally include wherein the processing circuit is configured to generate each of the second complex exponential component of the first kernel and the one or more further complex exponential components of the first kernel based on the maximum dynamic amplitude range of the one or more signals of the transmit signal sequence.

In Example 40, the subject matter of Example 25 can optionally include wherein the processing circuit is configured to generate the first kernel based on N transmit signals of the transmit signal sequence according to the expression $$\exp(j\theta_{X(t-\tau_1)})\exp\left(\frac{j2\pi k_1|X(t-\tau_1)|}{A_0}\right)\exp\left(\frac{j2\pi k_2|X(t-\tau_2)|}{A_0}\right)\ldots$$

-continued $$\exp\left(\frac{j2\pi k_N |X(t-\tau_N)|}{A_0}\right),$$

where j is the imaginary unit, N+1 is the total quantity of complex exponential components of the first kernel, $\exp(j\theta_{X(t-\tau_1)})$ is the first complex exponential component of the first kernel, $$\exp\left(\frac{j2\pi k_1 |X(t-\tau_1)|}{A_0}\right)$$

is the second complex exponential component of the first kernel, $$\exp\left(\frac{j2\pi k_i |X(t-\tau_i)|}{A_0}\right)$$

for i={2, 3, . . . , N}, are the one or more further complex exponential components of the first kernel, $X(t-\tau_1)$ is the first transmit signal of the transmit signal sequence associated with time $t-\tau_1$, $X(t-\tau_2)$ is a second transmit signal of the transmit signal sequence associated with time $t-\tau_2$, $X(t-\tau_i)$ for i={3, 4, . . . , N} are one or more further transmit signals of the transmit signal sequence associated with the one or more further complex exponential components associated with time $t-\tau_i$, $\theta_{X(t-\tau_1)}$ is the phase of the first transmit signal of the transmit signal sequence, $|X(t-\tau_i)|$ for i={1, 2, . . . , N} are the magnitudes of the N transmit signals of the transmit signal sequence, $A_0$ is a parameter based on the range of the N transmit signals of the transmit signal sequence, and {$k_1$, $k_2$, . . . , $k_N$} are integer-valued kernel parameters.

In Example 41, the subject matter of any one of Examples 25 to 40 can optionally include wherein the processing circuit is configured to generate a first complex exponential component of a second kernel of the kernel set based on the phase of a second transmit signal of the transmit signal sequence and a second complex exponential component of the second kernel based on the amplitude of the second transmit signal of the transmit signal sequence.

In Example 42, the subject matter of Example 41 can optionally include wherein the processing circuit is configured to generate a first complex exponential component of each respective kernel of the kernel set based on the phase of a respective transmit signal of the transmit signal sequence and a second complex exponential component of each respective kernel based on the amplitude of the respective transmit signal of the transmit signal sequence.

In Example 43, the subject matter of Example 42 can optionally include the processing circuit is configured to generate the kernel set wherein each respective kernel of the kernel set has a substantially equal amplitude to the other kernels of the kernel set, and wherein each respective kernel is a phase rotation of the other kernels of the kernel set.

In Example 44, the subject matter of any one of Examples 41 to 43 can optionally include wherein the processing circuit is configured to generate the kernel set wherein the first kernel has substantially equal amplitude to the second kernel, and wherein the first kernel is a phase rotation of the second kernel.

In Example 45, the subject matter of any one of Examples 25 to 44 can optionally include wherein the transceiver device is included in a mobile communication device.

Example 46 is a method for processing signals. The method includes generating a kernel set including one or more kernels based on a transmit signal sequence including one or more transmit signals, wherein a first kernel of the kernel set includes a first complex exponential component of the first kernel based on the phase of a first transmit signal of the transmit signal sequence, and a second complex exponential component of the first kernel based on the amplitude of the first transmit signal of the transmit signal sequence, and generating a parameter set including one or more parameters as a solution to a linear system using the kernel set, wherein the parameter set represents a substantially linear relationship between the kernel set and a leakage signal sequence including one or more leakage signals, applying the kernel set and the parameter set in order to generate an estimated leakage signal, and processing one or more received signals using the estimated leakage signal.

In Example 47, the subject matter of Example 46 can optionally with a transmitter device, transmitting the one or more transmit signals of the transmit signal sequence, and with a receiver device, receiving the one or more received signals.

In Example 48, the subject matter of Example 47 can optionally include wherein the processing one or more received signals using the estimated leakage signal includes applying the estimated leakage signal to a received signal of the one or more received signals received by the receiver device in order to remove a leakage signal of the leakage signal sequence from the received signal.

In Example 49, the subject matter of Example 48 can optionally include wherein the applying the estimated leakage signal to a received signal of the one or more received signals in order to remove a leakage signal of the leakage signal component from the received signal includes subtracting the estimated leakage signal from the received signal.

In Example 50, the subject matter of Example 46 can optionally with a receiver, receiving the one or more received signals, wherein the one or more received signals contain desired data traffic.

In Example 51, the subject matter of Example 46 can optionally with a transmitter, transmitting each of the one or more transmit signals of the transmit signal sequence at a different point in time.

In Example 52, the subject matter of Example 46 can optionally include wherein a relationship between the transmit signal sequence and the leakage signal sequence is non-linear, and wherein the generating a kernel set including one or more kernels includes generating a kernel set wherein the relationship between the kernel set and the leakage signal sequence is substantially linear.

In Example 53, the subject matter of Example 46 can optionally include wherein the generating a parameter set including one or more parameters as a solution to a linear system using the kernel set includes applying linear estimation processing to the linear system to generate a parameter set.

In Example 54, the subject matter of Example 53 can optionally include wherein the applying linear estimation processing to the linear system to generate the parameter set includes applying at least one of recursive least squares estimation, least mean squares estimation, conjugate gradient, or coordinate descent to the linear system to generate a parameter set.

In Example 55, the subject matter of Example 46 can optionally with a transmitter, transmitting each of the one or more transmit signals of the transmit signal sequence at a respective transmission time, wherein each leakage signal of the leakage signal sequence corresponds to a respective transmit signal of the transmit signal sequence.

In Example 56, the subject matter of any one of Examples claims 46 to 55 can optionally include wherein the generating a kernel set including one or more kernels based on a transmit signal sequence including one or more transmit signals includes obtaining the phase of the first complex exponential component of the first kernel based on the phase of the first transmit signal of the transmit signal sequence, and obtaining the phase of the second complex exponential component of the first kernel based on the amplitude of the first transmit signal of the transmit signal sequence.

In Example 57, the subject matter of Example 46 can optionally include wherein the generating a kernel set including one or more kernels based on a transmit signal sequence including one or more transmit signals includes obtaining the phase of the first complex exponential component of the first kernel based on the phase of the first transmit signal of the transmit signal sequence, and obtaining the phase of the second complex exponential component of the first kernel based on the amplitude of the first transmit signal of the transmit signal sequence, and generating the first kernel as the product of the first complex exponential component of the first kernel and the second complex exponential component of the first kernel.

In Example 58, the subject matter of any one of Examples claims 46 to 57 can optionally include wherein the generating a kernel set including one or more kernels based on a transmit signal sequence including one or more transmit signals includes generating the first kernel according to the expression $\exp(j\theta_{X(t-\tau)})\exp(j2\pi k|X(t-\tau)|/A_0)$, where j is the imaginary unit, $X(t-\tau)$ is the first transmit signal of the transmit signal sequence associated with time $t-\tau$, $\theta_{X(t-\tau)}$ is the phase of the first transmit signal of the transmit signal sequence, $|X(t-\tau)|$ is the magnitude of the first transmit signal of the transmit signal sequence, $A_0$ is a parameter based on the amplitude range of the first transmit signal of the transmit signal sequence, k is an integer-valued kernel parameter, $\exp(j\theta_{X(t-\tau)})$ is the first complex exponential component of the first kernel, and $\exp(j2\pi k|X(t-\tau)|/A_0)$ is the second complex exponential component of the first kernel.

In Example 59, the subject matter of Example 46 can optionally include wherein the generating a kernel set including one or more kernels based on a transmit signal sequence including one or more transmit signals includes generating the first kernel as the product of the first complex exponential component of the first kernel, the second complex exponential component of the first kernel, and one or more further complex exponential components of the first kernel, wherein each of the second complex exponential component of the first kernel and the one or more further complex exponential components of the first kernel differ in phase according to the amplitude of one or more transmit signals of the transmit signal sequence.

In Example 60, the subject matter of Example 59 can optionally include wherein the generating a kernel set including one or more kernels based on a transmit signal sequence including one or more transmit signals includes generating each of the second complex exponential component of the first kernel and the one or more further complex exponential components of the first kernel based on the maximum dynamic amplitude range of the one or more transmit signals of the transmit signal sequence.

In Example 61, the subject matter of Example 59 can optionally include, wherein generating a kernel set including one or more kernels based on a transmit signal sequence including one or more transmit signals includes generating the first kernel based on N transmit signals of the transmit signal sequence according to the expression $$\exp(j\theta_{X(t-\tau_1)})\exp\left(\frac{j2\pi k_1|X(t-\tau_1)|}{A_0}\right)\exp\left(\frac{j2\pi k_2|X(t-\tau_2)|}{A_0}\right)\ldots \exp\left(\frac{j2\pi k_N|X(t-\tau_N)|}{A_0}\right),$$

where j is the imaginary unit, N+1 is the total quantity of complex exponential components of the first kernel, $\exp(j\theta_{X(t-\tau_1)})$ is the first complex exponential component of the first kernel, $$\exp\left(\frac{j2\pi k_1|X(t-\tau_1)|}{A_0}\right)$$

is the second complex exponential component of the first kernel, $$\exp\left(\frac{j2\pi k_i|X(t-\tau_i)|}{A_0}\right)$$

for i={2, 3, . . . , N}, are the one or more further complex exponential components of the first kernel, $X(t-\tau_1)$ is the first transmit signal of the transmit signal sequence associated with time $t-\tau_1$, $X(t-\tau_2)$ is a second transmit signal of the transmit signal sequence associated with time $t-\tau_2$, $X(t-\tau_i)$ for i={3, 4, . . . , N} are one or more further transmit signals of the transmit signal sequence associated with the one or more further complex exponential components associated with time $t-\tau_i$, $\theta_{X(t-\tau_1)}$ is the phase of the first transmit signal of the transmit signal sequence, $|X(t-\tau_i)|$ for i={1, 2, . . . , N} are the magnitudes of the N transmit signals of the transmit signal sequence, $A_0$ is a parameter based on the range of the N transmit signals of the transmit signal sequence, and {$k_1$, $k_2$, . . . , $k_N$} are integer-valued kernel parameters.

In Example 62, the subject matter of any one of Examples claim 46 to can optionally include, wherein the generating a kernel set including one or more kernels based on a transmit signal sequence including one or more transmit signals includes generating a second kernel of the kernel set wherein the second kernel includes a first complex exponential component of the second kernel based on the phase of a second transmit signal of the transmit signal sequence, and a second complex exponential component of the second kernel based on the amplitude of the second transmit signal of the transmit signal sequence.

In Example 63, the subject matter of Example 62 can optionally include wherein the generating a kernel set including one or more kernels based on a transmit signal sequence including one or more transmit signals includes generating each respective kernel of the kernel set wherein each respective kernel includes a first complex exponential component of the respective kernel based on the phase of a respective transmit signal of the transmit signal sequence and a second complex exponential component of the respective kernel based on the amplitude of the respective transmit signal of the transmit signal sequence.

In Example 64, the subject matter of Example 63 can optionally include wherein the generating a kernel set including one or more kernels based on a transmit signal sequence including one or more transmit signals includes generating each respective kernel of the kernel set wherein each respective kernel of the kernel set has substantially equal amplitude to the other kernels of the kernel set, and wherein each respective kernel is a phase rotation of the other kernels of the kernel set.

In Example 65, the subject matter of Example 62 can optionally include wherein the generating a kernel set including one or more kernels based on a transmit signal sequence including one or more transmit signals includes generating the first kernel wherein the first kernel has substantially equal amplitude to the second kernel, and wherein the second kernel is a phase rotation of the second kernel.

In Example 66, the subject matter of any one of Examples 46 to 65 can optionally with a transmitter, transmitting the one or more transmit signals of the transmit signal sequence, and with a receiver, receiving the one or more received signals, wherein the transmitter and the receiver are part of a transceiver component of a mobile communication device.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A data processing system comprising:
a transmit circuit configured to transmit a first signal sequence comprising one or more signals;
a receive circuit configured to receive a second signal sequence comprising one or more additional signals, wherein one or more additional signals of the second signal sequence comprise an interference component arising from the first signal sequence; and
a processing circuit configured to:
generate a kernel set comprising one or more orthogonal kernels based on the first signal sequence, wherein a first kernel of the kernel set comprises: a first complex exponential component of the first kernel based on the phase of a first signal of the first signal sequence, and a second complex exponential component of the first kernel based on the amplitude of the first signal of the first signal sequence, and
apply the kernel set to generate a solution to a linear system, wherein the solution to the linear system represents a substantially linear relationship between the kernel set and the interference component of the second signal sequence arising from the first signal sequence.

2. The data processing system of claim 1, wherein the transmit circuit is a wireless transmitter configured to transmit the one or more signals of the first signal sequence and the receive circuit is a wireless receiver configured to receive the one or more additional signals of the second signal sequence.

3. The data processing system of claim 2, wherein the processing circuit is configured to generate the solution to the linear system as a parameter set that represents a substantially linear relationship between the first signal sequence and the interference component of the second signal sequence.

4. The data processing system of claim 3, wherein the processing circuit is further configured to:

apply the parameter set to one or more signals of the first signal sequence to generate a signal leakage estimate; and
apply the signal leakage estimate to a first signal of the second signal sequence to remove signal leakage from the first signal of the second signal sequence.

5. The data processing system of claim 1, wherein the processing circuit is configured to generate the first kernel wherein the phase of first complex exponential component of the first kernel is based on the phase of the first signal of the first signal sequence and the phase of the second complex exponential component of the first kernel is based on the amplitude of the first of the first signal of the first signal sequence.

6. The data processing system of claim 1, wherein the processing circuit is configured to generate the first kernel as the matrix product of the first complex exponential component of the first kernel and the second complex exponential component of the first kernel.

7. The data processing system of any one of claim 1, wherein the processing circuit is configured to generate the first kernel based on the first signal sequence according to the expression $\exp(j\theta_{X(t-\tau)})\exp(j2\pi k|X(t-\tau)|/A_0)$, where j is the imaginary unit, $X(t-\tau)$ is the first signal of the first signal sequence associated with time $t-\tau$, $\theta_{X(t-\tau)}$ is the phase of the first signal of the first signal sequence, $|X(t-\tau)|$ is the magnitude of the first signal of the first signal sequence; $A_0$ is a parameter based on the range of the first signal of the first signal sequence, k is an integer-valued kernel parameter, $\exp(j\theta_{X(t-\tau)})$, is the first complex exponential component of the first kernel, and $\exp(j2\pi k|X(t-\tau)|/A_0)$ is the second complex exponential component of the first kernel.

8. The data processing system of claim 1, wherein the processing circuit is configured to generate the first kernel as the matrix product of the first complex exponential component of the first kernel, the second complex exponential component of the first kernel, and one or more further complex exponential components of the first kernel, wherein each of the second complex exponential component of the first kernel and the one or more further complex exponential components of the first kernel differ in phase according to the amplitude of one or more signals of the first signal sequence.

9. The data processing system of claim 8, wherein the processing circuit is configured to generate each of the second complex exponential component of the first kernel and the one or more further complex exponential components of the first kernel based on the maximum dynamic range of the one or more signals of the first signal sequence.

10. The data processing system of claim 8, wherein the processing circuit is configured to generate the first kernel based on N signals of the first signal sequence according to the expression $$\exp(j\theta_{X(t-\tau_1)})\exp\left(\frac{j2\pi k_1|X(t-\tau_1)|}{A_0}\right)\exp\left(\frac{j2\pi k_2|X(t-\tau_2)|}{A_0}\right)\ldots$$
$$\exp\left(\frac{j2\pi k_N|X(t-\tau_N)|}{A_0}\right),$$

where j is the imaginary unit, N+1 is the total quantity of complex exponential components of the first kernel, $\exp(j\theta_{X(t-\tau_1)})$ is the first complex exponential component of the first kernel, $$\exp\left(\frac{j2\pi k_1 |X(t-\tau_1)|}{A_0}\right)$$

is the second complex exponential component of the first kernel, $$\exp\left(\frac{j2\pi k_i |X(t-\tau_i)|}{A_0}\right)$$

for i={2, 3, . . . , N}, are the one or more further complex exponential components of the first kernel, $X(t-\tau_1)$ is the first signal of the first signal sequence associated with time $t-\tau_1$, $X(t-\tau_2)$ is a second signal of the first signal sequence associated with time $t-\tau_2$, $X(t-\tau_i)$ for t={3, 4, . . . , N} are one or more further signals of the first signal sequence associated with the one or more further complex exponential components associated with time $t-\tau_i$, $\theta_{X(t-\tau_i)}$ is the phase of the first signal of the first signal sequence, $|X(t-\tau_i)|$ for i={1, 2, . . . , N} are the magnitudes of the N signals of the first signal sequence, $A_0$ is a parameter based on the range of the N signals of the first signal sequence, and $\{k_1, k_2, \ldots, k_N\}$ are integer-valued kernel parameters.

11. The signal processing system of claim 1, wherein the processing circuit is configured to generate a first complex exponential component of a second kernel of the kernel set based on the phase of a second signal of the first signal sequence, and a second complex exponential component of the second kernel based on the amplitude of the second signal of the first signal sequence.

12. The signal processing system of claim 11, wherein the processing circuit is configured to generate the first kernel wherein the first kernel has substantially equal amplitude to the second kernel, and wherein the first kernel is a phase rotation of the second kernel.

13. A transceiver device comprising:
a transmitter associated with a transmit signal sequence comprising one or more transmit signals;
a receiver associated with a receive signal sequence comprising one or more receive signals, wherein one or more of the receive signals of the receive signal sequence contain signal leakage associated with the one or more transmit signals of the transmit signal sequence; and
a processing circuit configured to:
generate a kernel set comprising one or more orthogonal kernels based on the transmit signal sequence, wherein a first kernel of the kernel set comprises: a first complex exponential component of the first kernel based on the phase of a first transmit signal of the transmit signal sequence, and a second complex exponential component of the first kernel based on the amplitude of the first transmit signal of the transmit signal sequence, and
apply the kernel set to generate a solution to a linear system, wherein the solution to the linear system represents a substantially linear relationship between the kernel set and the signal leakage associated with the one or more transmit signals of the transmit signal sequence.

14. The transceiver device of claim 13, wherein the solution to the linear system is a parameter set comprising one or more parameters,
and wherein the processing circuit is further configured to:

apply the parameter set to one or more transmit signals of the transmit signal sequence to generate a signal leakage estimate; and
apply the signal leakage estimate to a first receive signal of the receive signal sequence to remove the signal leakage from the first receive signal of the receive signal sequence.

15. The transceiver device of claim 13, wherein the processing circuit is configure to generate the phase of the first complex exponential component of the first kernel based on the phase of the first transmit signal of the transmit signal sequence and the phase of the second complex exponential component of the first kernel based on the amplitude of the first transmit signal of the transmit signal sequence,
and wherein the processing circuit is configured to generate the first kernel as the matrix product of the first complex exponential component of the first kernel and the second complex exponential component of the first kernel.

16. A method for processing signals comprising:
generating a kernel set comprising one or more orthogonal kernels based on a transmit signal sequence comprising one or more transmit signals, wherein a first kernel of the kernel set comprises: a first complex exponential component of the first kernel based on the phase of a first transmit signal of the transmit signal sequence, and a second complex exponential component of the first kernel based on the amplitude of the first transmit signal of the transmit signal sequence, and
generating a parameter set comprising one or more parameters as a solution to a linear system using the kernel set, wherein the parameter set represents a substantially linear relationship between the kernel set and a leakage signal sequence comprising one or more leakage signals;
applying the kernel set and the parameter set in order to generate an estimated leakage signal; and
processing one or more received signals using the estimated leakage signal.

17. The method of claim 16, further comprising:
with a transmitter device, transmitting the one or more transmit signals of the transmit signal sequence; and
with a receiver device, receiving the one or more received signals.

18. The method of claim 17, wherein the processing one or more received signals using the estimated leakage signal comprises:
applying the estimated leakage signal to a received signal of the one or more received signals received by the receiver device in order to remove a leakage signal of the leakage signal sequence from the received signal.

19. The method of claim 16, wherein the generating a kernel set comprising one or more kernels based on a transmit signal sequence comprising one or more transmit signals comprises:
obtaining the phase of the first complex exponential component of the first kernel based on the phase of the first transmit signal of the transmit signal sequence; and
obtaining the phase of the second complex exponential component of the first kernel based on the amplitude of the first transmit signal of the transmit signal sequence; and
generating the first kernel as the matrix product of the first complex exponential component of the first kernel and the second complex exponential component of the first kernel.

20. The method of claim 16, wherein the generating a kernel set comprising one or more kernels based on a transmit signal sequence comprising one or more transmit signals comprises:
   generating the first kernel as the matrix product of the first complex exponential component of the first kernel, the second complex exponential component of the first kernel, and one or more further complex exponential components of the first kernel, wherein each of the second complex exponential component of the first kernel and the one or more further complex exponential components of the first kernel differ in phase according to the amplitude of one or more transmit signals of the transmit signal sequence.

* * * * *